United States Patent
Brown (10) Patent No.: US 9,856,898 B2
(45) Date of Patent: Jan. 2, 2018

(54) SWAGE LOCK FASTENERS

(71) Applicant: Alcoa Inc., Pittsburgh, PA (US)

(72) Inventor: Robert Brown, Melbourne (AU)

(73) Assignee: ARCONIC INC., Pittsburgh, PA (US)

(*) Notice: Subject to any disclaimer, the term of this patent is extended or adjusted under 35 U.S.C. 154(b) by 196 days.

(21) Appl. No.: 14/697,857

(22) Filed: Apr. 28, 2015

(65) Prior Publication Data

US 2015/0308479 A1  Oct. 29, 2015

Related U.S. Application Data

(60) Provisional application No. 61/985,641, filed on Apr. 29, 2014.

(51) Int. Cl.
| F16B 19/05 | (2006.01) |
| F16B 39/02 | (2006.01) |
| F16B 37/04 | (2006.01) |

(52) U.S. Cl.
CPC ............ *F16B 19/05* (2013.01); *F16B 39/026* (2013.01); *F16B 37/044* (2013.01)

(58) Field of Classification Search
CPC .............................. F16B 19/05; F16B 39/026
USPC .................................................. 411/361, 260
See application file for complete search history.

(56) References Cited

U.S. PATENT DOCUMENTS

| 2,531,048 A | 11/1950 | Huck |
| 2,531,049 A | 11/1950 | Huck |
| 2,764,045 A | 9/1956 | Koenig |
| 3,029,665 A | 4/1962 | Baugh et al. |
| 3,215,024 A | 11/1965 | Brilmyer et al. |
| 3,295,404 A * | 1/1967 | Baker ................... B21J 15/022 411/361 |
| 3,371,572 A * | 3/1968 | King, Jr. ................. F16B 19/05 29/517 |
| 3,421,562 A * | 1/1969 | Orloff .................... F16B 19/05 29/517 |

(Continued)

FOREIGN PATENT DOCUMENTS

| CN | 103244532 A | 8/2013 |
| CN | 204572698 U | 8/2015 |

(Continued)

OTHER PUBLICATIONS

International Search Report and Written Opinion dated Jul. 28, 2015, issued by the European Patent Office in International Application No. PCT/US2015/027894 (9 pages).

*Primary Examiner* — Flemming Saether
(74) *Attorney, Agent, or Firm* — Greenburg Traurig, LLP (57) ABSTRACT

A fastener includes a pin member, a swage collar, and an insert. The pin member includes an elongated shank portion, a head, a threaded portion having an external thread and a plurality of lock grooves, and a pull portion. The swage collar includes a shank having a flange and a through bore with a first interior portion extending from a first end of the collar to a stepped portion and forming a first inner wall having a first inner diameter, and a second interior portion extending from the stepped portion to a second end of the collar and forming a second inner wall having a second inner diameter. The insert includes a through bore forming an inner wall that has an internal thread adapted to engage the external thread of the pin member.

20 Claims, 7 Drawing Sheets

(56) References Cited

U.S. PATENT DOCUMENTS

| | | | | |
|---|---|---|---|---|
| 3,655,227 A | * | 4/1972 | Orloff | F16B 19/05 29/446 |
| 3,803,793 A | * | 4/1974 | Dahl | F16B 31/04 29/446 |
| 3,915,053 A | | 10/1975 | Buhl | |
| 3,920,338 A | * | 11/1975 | Dahl | F16B 19/05 403/19 |
| 4,069,575 A | * | 1/1978 | Sigmund | B23P 11/02 29/446 |
| 4,299,519 A | | 11/1981 | Corbett | |
| 4,447,077 A | | 5/1984 | Palmer | |
| 4,472,096 A | | 9/1984 | Ruhl et al. | |
| 4,531,871 A | | 7/1985 | Sigmund | |
| 4,597,263 A | | 7/1986 | Corbett | |
| 4,813,834 A | | 3/1989 | Smith | |
| 4,867,625 A | | 9/1989 | Dixon | |
| 4,878,372 A | | 11/1989 | Port et al. | |
| 4,921,384 A | | 5/1990 | Nordyke | |
| 4,943,196 A | | 7/1990 | Dahl | |
| 4,995,777 A | | 2/1991 | Warmington | |
| 5,049,016 A | | 9/1991 | Nordyke | |
| 5,090,852 A | | 2/1992 | Dixon | |
| 5,125,778 A | | 6/1992 | Sadri | |
| 5,315,755 A | | 5/1994 | Fulbright et al. | |
| 5,548,889 A | | 8/1996 | Smith et al. | |
| 5,604,968 A | | 2/1997 | Fulbright et al. | |
| 6,233,802 B1 | | 5/2001 | Fulbright | |
| 6,235,582 B1 | | 5/2001 | Chen | |
| 6,325,582 B1 | | 12/2001 | Sadri et al. | |
| 6,497,024 B2 | | 12/2002 | Fulbright | |
| 6,702,684 B2 | | 3/2004 | Harbin et al. | |
| 7,195,438 B2 | | 3/2007 | Harbin et al. | |
| 7,293,339 B2 | | 11/2007 | Mercer et al. | |
| 7,921,530 B2 | | 4/2011 | Mercer et al. | |
| 8,621,734 B2 | | 1/2014 | Mercer et al. | |
| 2007/0003393 A1 | | 1/2007 | Mercer et al. | |

FOREIGN PATENT DOCUMENTS

| | | |
|---|---|---|
| GB | 852757 | 11/1960 |
| GB | 2237347 A | 5/1991 |

* cited by examiner

SWAGE LOCK FASTENERS

CROSS-REFERENCE TO RELATED APPLICATION

This application is a Section 111(a) application relating to and claiming the benefit of commonly-owned, U.S. Provisional Patent Application Ser. No. 61/985,641, entitled "SWAGE LOCK FASTENERS," filed Apr. 29, 2014, the entirety of which is incorporated herein by reference.

FIELD OF THE INVENTION

The present invention relates to fasteners and, more particularly, swage lock fasteners.

BACKGROUND OF THE INVENTION

Swage lock fasteners are used to secure a plurality of work pieces to one another. Typically, swage lock fasteners include a pin member having lock grooves and a lock bolt collar adapted to be swaged into the lock grooves of the pin member by a fastener installation tool. It is desired that a swage lock fastener include a fit-up capability in order to pre-assemble it on a work piece and adjust it as required.

SUMMARY OF THE INVENTION

In an embodiment, a fastener includes a pin member, a swage collar, and an insert. The pin member has an elongated shank portion having a first end and a second end, the shank portion including a head at the first end, a threaded portion intermediate the first end and the second end, and a pull portion at the second end, the threaded portion including an external thread and a plurality of lock grooves. The swage collar includes a shank having a first end, a second end opposite the first end, and an outside diameter, a flange extending from the first end of the shank of the swage collar, and a through bore extending longitudinally from the first end to the second end, the through bore including a first interior portion extending from the first end to a stepped portion and forming a first inner wall having a first inner diameter, the through bore further including a second interior portion extending from the stepped portion to the second end and forming a second inner wall having a second inner diameter. The insert has a first end, a second end opposite the first end, an outside diameter, and a through bore extending longitudinally from the first end to the second end forming an inner wall, the inner wall including an internal thread extending from the first end to proximate to the second end and adapted to engage the external thread of the pin member.

In an embodiment, the first inner diameter of the swage collar is greater than the second inner diameter of the swage collar. In an embodiment, the first inner diameter of the swage collar is less than the second inner diameter of the swage collar. In an embodiment, the external thread comprises a helical thread. In an embodiment, the threaded portion further comprises an annular groove positioned intermediate the head and the pull portion. In an embodiment, a width of the annular groove is in the range of one times a pitch of the helical thread to two times a pitch of the helical thread.

In an embodiment, the pull portion comprises a plurality of annular pull grooves. In an embodiment, the outside diameter of the insert is sized to form an interference fit with respect to the first inner diameter of the swage collar. In an embodiment, the outside diameter of the insert is sized to form an interference fit with respect to the second inner diameter of the swage collar. In an embodiment, the stepped portion is substantially perpendicular to a longitudinal axis of the swage collar. In an embodiment, the swage collar further comprises an internal fit-up tab. In an embodiment, the insert further comprises a nut portion intermediate the first end and the second end, a diameter of the nut portion being greater than the first inner diameter of the through bore of the swage collar and greater than the second inner diameter of the through bore of the swage collar. In an embodiment, the nut portion is hexagonal in shape or square in shape.

In an embodiment, the flange of the swage collar is cylindrical in shape or hexagonal in shape. In an embodiment, the swage collar is adapted to be swaged onto the pin member. In an embodiment, the internal thread of the insert extends from the first end of the insert to the second end of the insert.

In an embodiment, the pin member comprises carbon steel. In an embodiment, the pin member is a bolt selected from the group consisting of a Grade 9 strength level bolt, a Class 12.9 strength level bolt, a Grade 2 strength level bolt, a Grade 5 strength level bolt, a Grade 8 strength level bolt, a Class 8.8 strength level bolt, and a Class 10.9 strength level bolt.

In an embodiment, the swage collar comprises a material selected from the group consisting of low carbon steel, unannealed low carbon steel, annealed low carbon steel, medium carbon boron steel, 10B22 steel, medium carbon steel, and 1038 steel. In an embodiment, the swage collar is as-headed, strain-hardened, or cold-worked. In an embodiment, the insert comprises medium carbon alloy steel.

DETAILED DESCRIPTION OF THE DRAWINGS

Figure 1:
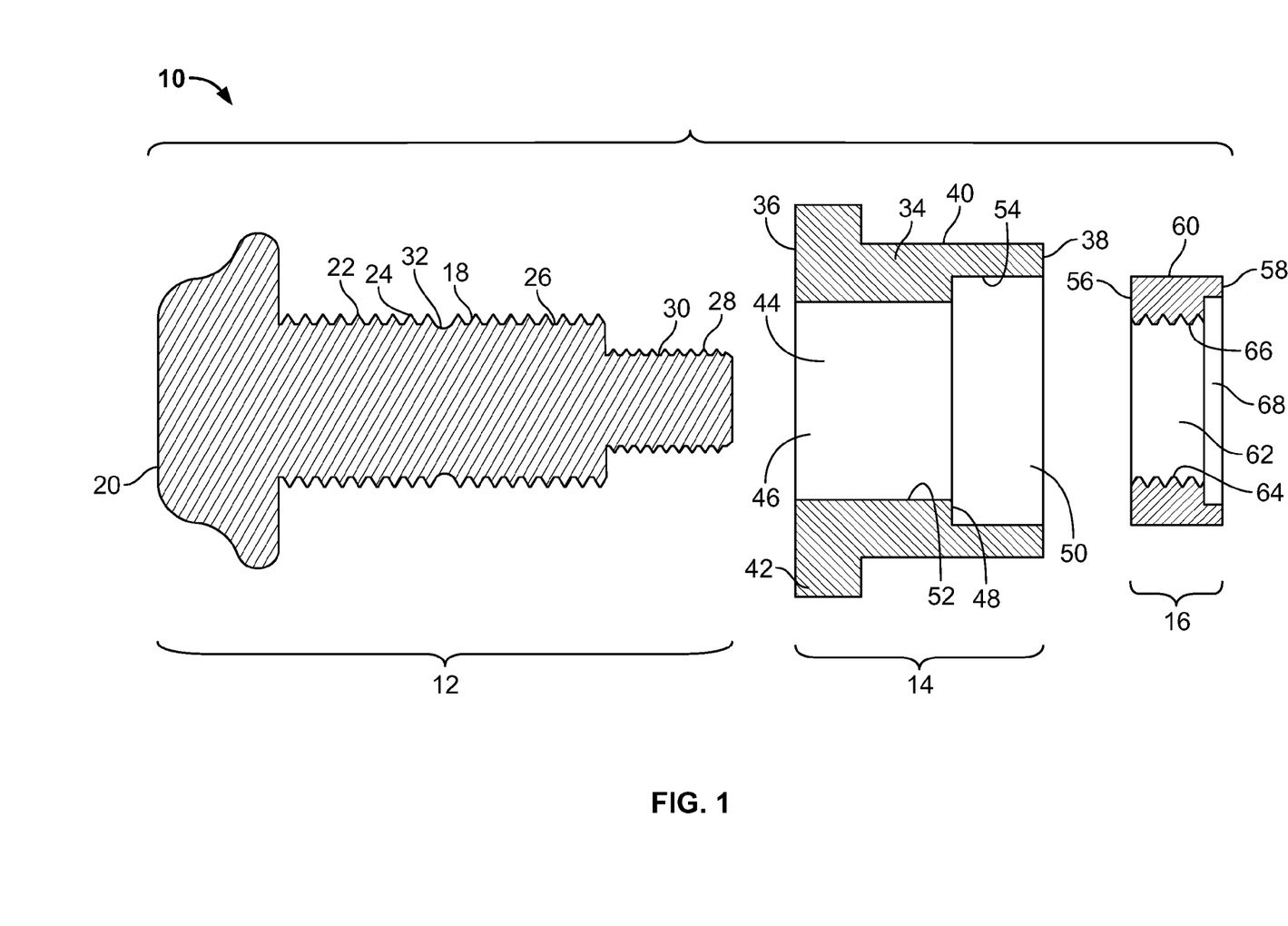
FIG. 1 is an exploded side view of a fastener in accordance with an embodiment.

Referring to FIG. 1, in an embodiment, a fastener 10 includes a pin member 12, a collar 14 that is sized and shaped to mate with and be swaged onto the pin member 12, and an insert 16 that is sized and shaped to mate with the pin member 12 and the collar 14. In an embodiment, the pin member 12 includes an elongated shank portion 18 with a head 20 at one end thereof. In an embodiment, the shank portion 18 includes a threaded portion 22 having an external thread 24 and a plurality of lock grooves 26, and a pull portion 28 having a plurality of pull grooves 30. In an embodiment, the thread 24 includes a helical thread. In an embodiment, the plurality of pull grooves 30 of the pull portion 28 includes annular grooves. In an embodiment, the threaded portion 22 includes an annular groove 32. In an embodiment, the annular groove 32 is positioned intermediate the head 20 and the pull portion 28. In an embodiment, the annular groove may positioned anywhere along the threaded portion 22. In an embodiment, the width of the annular groove 32 is two times the pitch of the thread 24. In an embodiment, the width of the annular groove 32 is one times the pitch of the thread 24. In an embodiment, the annular groove 32 need not be included. In an embodiment, the pin member 12 is made from medium carbon alloy steel. In an embodiment, the pin member 12 is a Grade 9 (Class 12.9) strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art. In other embodiments, the pin member 12 can consist of any of the pin members as disclosed and described in U.S. Pat. No. 7,293,339 to Mercer et al., which is incorporated by reference herein in its entirety.

Still referring to FIG. 1, the collar 14 includes a tubular-shaped shank 34 having a first end 36 and a second end 38 opposite the first end 36, an exterior surface 40, a flange 42 extending circumferentially from and at the first end 36, and a through-bore 44 extending longitudinally from the first end 36 to the second end 38. In an embodiment, the flange 42 is cylindrical in shape. In another embodiment, the flange 42 is hexagonal in shape. In another embodiment, the exterior surface 40 of the shank 34 includes a hex-shaped portion located proximate to the second end 38 (not shown in the Figures). In an embodiment, the through-bore 44 includes a first interior portion 46 that extends from the first end 36 to a stepped portion 48 intermediate the first and second ends 36, 38, and a second interior portion 50 that extends from the stepped portion 48 to the second end 38. In an embodiment, the stepped portion 48 is positioned perpendicularly to a longitudinal axis of the collar 14. In an embodiment, the first interior portion 46 forms a first inner wall 52 and the second interior portion 50 forms a second inner wall 54. In an embodiment, an inner diameter of the second inner wall 54 is greater than an inner diameter of the first inner wall 52.

In an embodiment, the collar 14 includes an internal fit-up tab extending from the first inner wall 52 (not shown in the Figures). In an embodiment, the fit-up tab includes a single thread, such as that shown in U.S. Pat. No. 4,867,625 to Dixon, which is incorporated by reference herein in its entirety. In an embodiment, the fit-up tab is positioned proximate to the first end 36 of the shank 34 of the collar 14. In another embodiment, the collar 14 need not include the fit-up tab.

In an embodiment, the collar 14 is made of low carbon steel. In another embodiment, the collar 14 is made from unannealed low carbon steel. In another embodiment, the collar 14 is made from annealed low carbon steel. In another embodiment, the collar 14 is made from medium carbon boron steel, such as, for example, 10B22 steel. In another embodiment, the collar 14 is made from medium carbon steel, such as, for example, 1038 steel. In another embodiment, the collar 14 is "as-headed" and does not require thermal processing, as disclosed and described in aforesaid U.S. Pat. No. 7,293,339 to Mercer et al. As employed herein, the term "as-headed" refers to a collar which is strain hardened, for example, from cold working, rather than changing hardness using a thermal process (e.g., quench and tempering; stress relieving; etc.).

Still referring to FIG. 1, in an embodiment, the insert 16 includes a first end 56, a second end 58 opposite the first end 56, an outer wall 60, a through-bore 62 extending longitudinally from the first end 56 to the second end 58, which forms an inner wall 64. In an embodiment, the inner wall 64 includes an internal thread 66 that extends from the first end 56 to proximate to the second end 58. In an embodiment, the internal thread 66 is a free-running thread. In an embodiment, the internal thread 66 extends from the first end 56 to the second end 58. In an embodiment, the inner wall 64 includes an unthreaded inner portion 68 located at the second end 58. In an embodiment, the insert 16 is made from medium carbon alloy steel. In other embodiments, the insert 16 may be made from other suitable materials known in the art.

Figure 2:
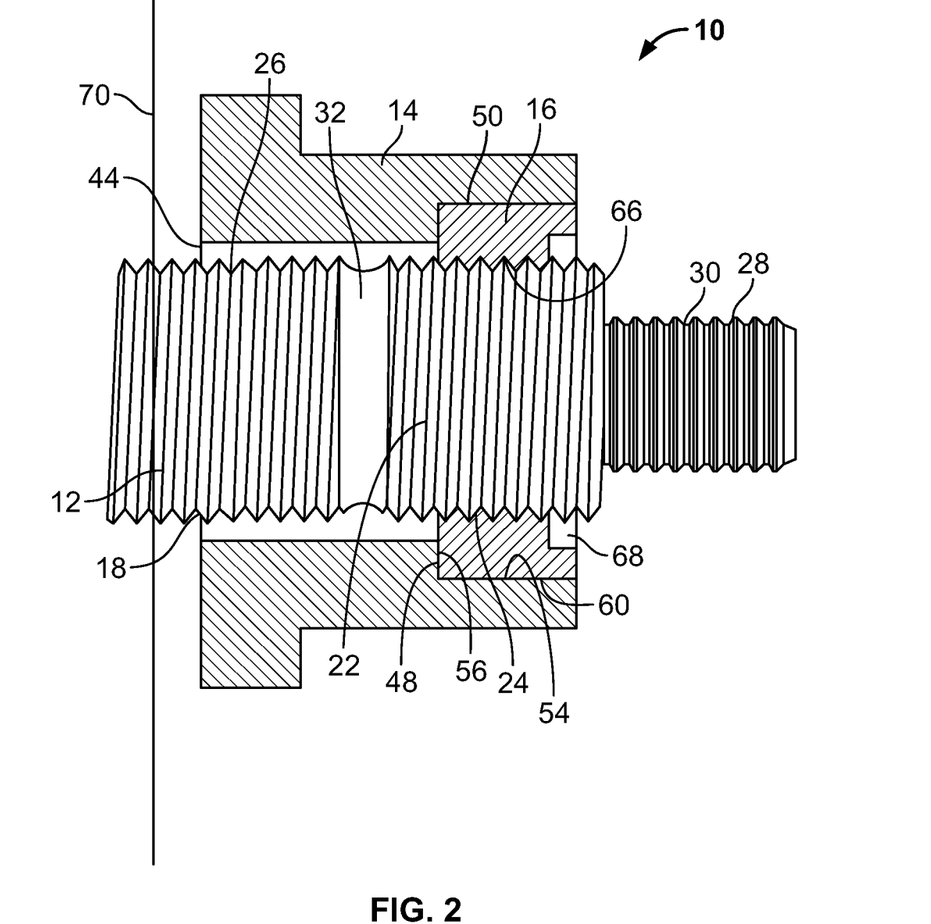
FIG. 2 is a partial side view of the fastener shown in FIG. 1 preassembled on a joint.

Referring to FIG. 2, in an embodiment, the fastener 10 is adapted to secure a joint 70 consisting of plurality of work pieces. In an embodiment, the shank portion 18 of the pin member 12 is inserted through holes of the work pieces, with the head 20 abutting one side of the work pieces (not shown) and the shank portion 18 extending outwardly from an opposite side of the work pieces. In an embodiment, the collar 14 is fitted on the shank portion 18 of the pin member 12, whereby the shank portion 18 is inserted within the through bore 44 of the collar 14. In an embodiment, the insert 16 is threaded on the threaded portion 22 of the pin member 12 such that the internal threads 66 of the insert 16 engage threadedly the external threads 24 of the pin member 12. The unthreaded portion 68 of the insert 16 acts as a lead-in. In an embodiment, the insert 16 is positioned within the second interior portion 50 of the collar 14, such that the first end 56 of the insert 16 abuts the stepped portion 48 of the collar 14. In an embodiment, the inner diameter of the inner wall 54 of the second interior portion 50 of the collar 14 and the outer diameter of the outer wall 60 of the insert 16 are sized to form an interference fit with one another. As shown in FIG. 2, the fastener 10 is pre-assembled such that the collar 14 is installed on the pin member 12 and retained by the insert 16 prior to swaging.

Figure 3:
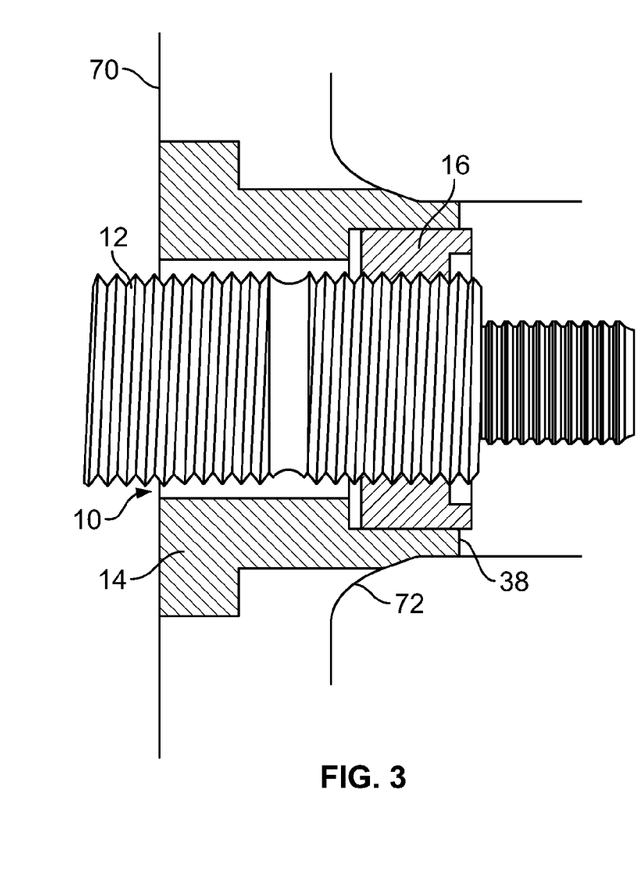
FIG. 3 is a partial side view of the fastener shown in FIG. 2 at an initial stage of a swaging process.

The pull grooves 30 of the pull portion 28 of the pin member 12 are adapted to be gripped by matching teeth of chuck jaws (not shown) of a fastener installation tool having a swage anvil 72 (see FIG. 3). In an embodiment, the fastener installation tool may consist of the tools disclosed and described in aforesaid U.S. Pat. No. 7,293,339 to Mercer et al. In an embodiment, the swage anvil 72 of the tool is adapted to engage the collar 14 and apply a relative axial force between the collar 14 and the pin member 12, and to move over the collar 14 and swage it into the lock grooves 26 of the pin member 12.

Figure 4:
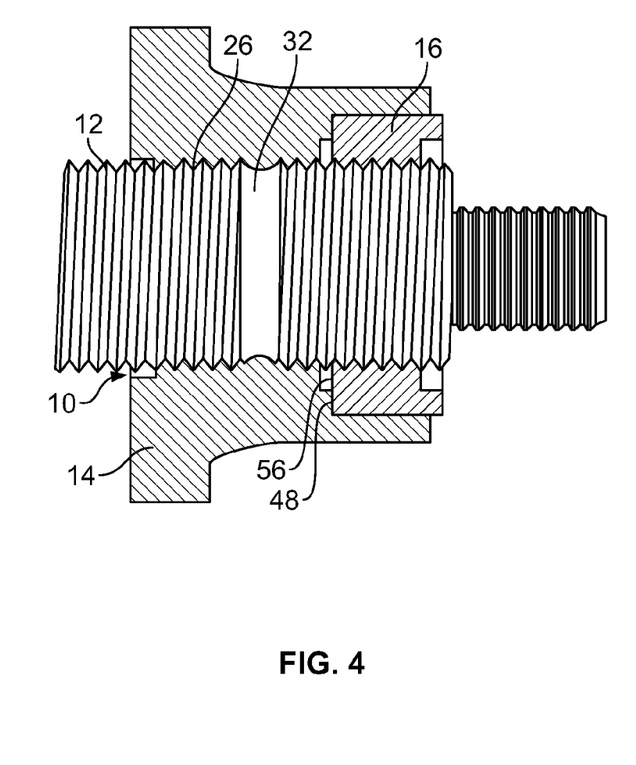
FIG. 4 is a partial side view of the fastener shown in FIG. 3 after the swaging process is complete.

Referring to FIG. 3, in an embodiment, swaging of the collar 14 by the swage anvil 72 commences at the second end 38 thereof, and the collar 14 moves longitudinally away from the insert 16 and towards the joint 70 to close any sheet gap. Referring to FIG. 4, in an embodiment, the collar 14 is completely swaged on the pin member 12, wherein the material of the collar 14 fills the lock grooves 26 of the pin member 12. In an embodiment, material of the collar 14 fills the annular groove 32 to provide a further locking capability. In an embodiment, the stepped portion 48 of the collar 14 deforms and flows around the first end 56 of the insert 16 in order to further secure the fastener 10.

FIGS. 5-8 disclose an embodiment of a fastener 110. In an embodiment, the fastener 110 can be utilized to compress a compression spring that is used to hold down a first structure onto a second structure. In an embodiment, the first structure is a timber sleeper and the second structure is a bridge beam. In this regard, referring to FIG. 5, in an embodiment, a collar 114 includes a tubular-shaped shank 134 having a first end 136 and a second end 138 opposite the first end 136, an exterior surface 140, a flange 142 extending circumferentially from and at the first end 136, and a through-bore 144 extending longitudinally from the first end 136 to the second end 138. In an embodiment, the flange 142 is cylindrical in shape. In another embodiment, the flange 142 is hexagonal in shape. In an embodiment, the exterior surface 140 of the shank 134 includes a hex-shaped portion located proximate to the second end 138 (not shown in the Figures). In an embodiment, the through-bore 144 includes a first interior portion 146 that extends from the first end 136 to a stepped portion 148 intermediate the first and second ends 136, 138, and a second interior portion 150 that extends from the stepped portion 148 to the second end 138. In an embodiment, the stepped portion 148 is positioned perpendicularly to a longitudinal axis of the collar 114. In an embodiment, the first interior portion 146 forms a first inner wall 152 and the second interior portion 150 forms a second inner wall 154. In an embodiment, an inner diameter of the second inner wall 154 is less than an inner diameter of the first inner wall 152.

Figure 5:
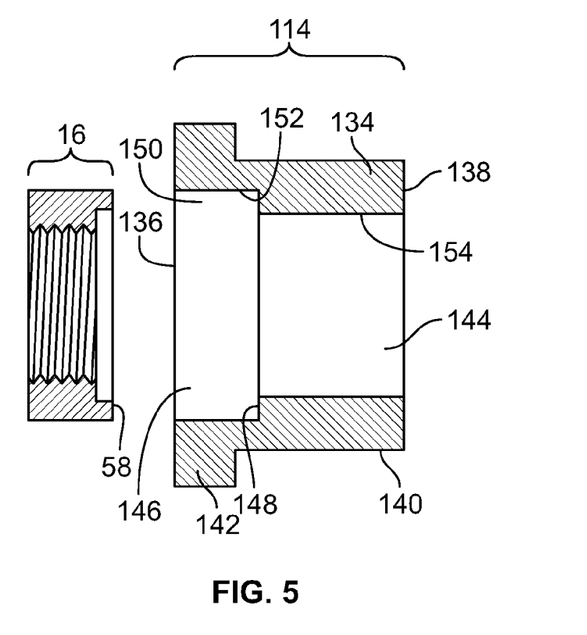
FIG. 5 is a side cross-sectional view of a collar and an insert employed by the fastener shown in FIG. 1.
Figure 6:
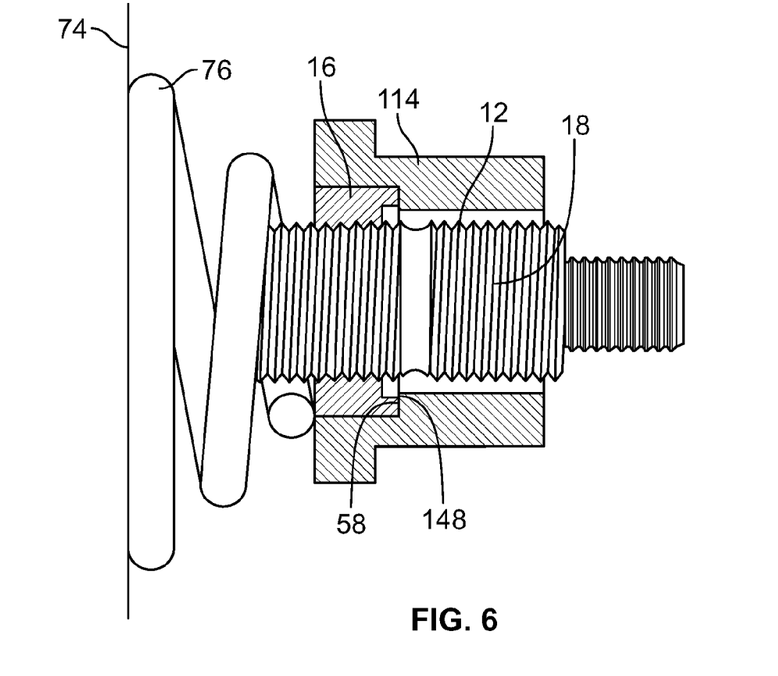
FIG. 6 is a side view of the fastener shown in FIG. 1 engaged with a spring member of a structure.
Figure 7:
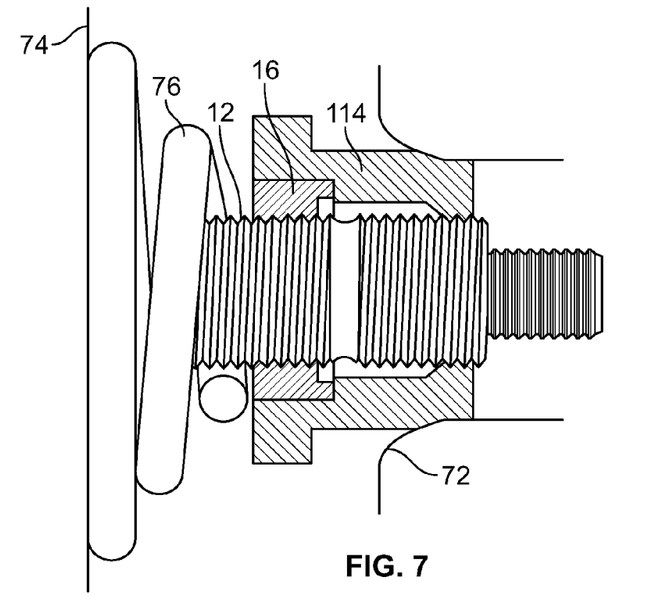
FIG. 7 is a partial side view of the fastener shown in FIG. 6 at an initial stage of a swaging process.
Figure 8:
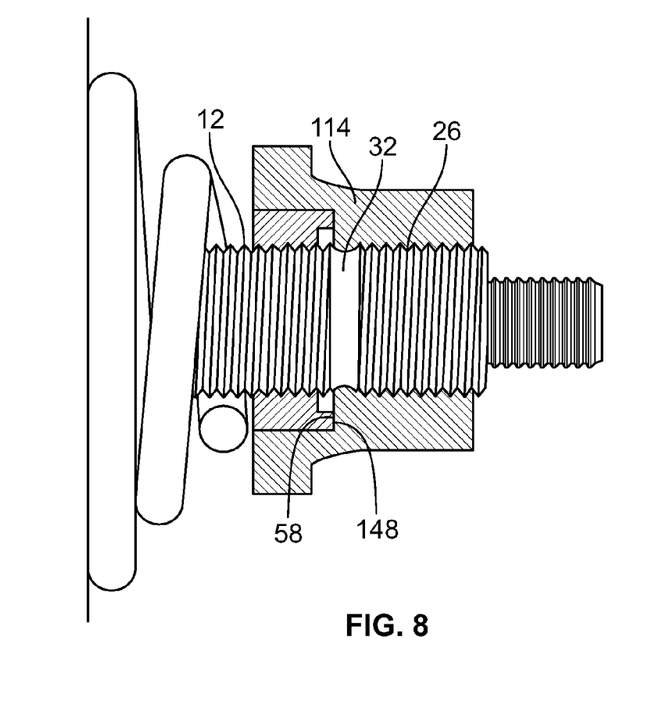
FIG. 8 is a partial side view of the fastener shown in FIG. 7 after the swaging process is complete.

Still referring to FIG. 5, the insert 16 is inserted into the second interior portion 150 of the collar 114 in a reverse manner from that described above, such that the second end 58 of the insert abuts the stepped portion 148 of the collar 114. Referring to FIG. 6, in an embodiment, a structure 74 includes a compression spring member 76. In an embodiment, the pin member 12 is inserted through the spring member 76, such that the shank 18 extends outwardly therefrom, and head 20 of the pin member 12 engages the coils of the spring member 76 (not shown in the Figures). In an embodiment, the insert 16 is threaded onto the pin member 12 and the collar 114 is fitted over the insert 16, such that the second end 58 of the insert abuts the stepped portion 148 of the collar 114, as described above. Referring to FIG. 7, the swage anvil 72 of the fastener installation tool commences swaging of the collar 114 onto the pin member 12, and the collar 114 moves longitudinally in a direction toward the structure 74. Referring to FIG. 8, in an embodiment, the collar 114 is completely swaged onto the pin member 12, wherein material of the collar 114 fills the lock grooves 26 of the pin member 12. In an embodiment, material of the collar 114 fills the annular groove 32 to provide a further locking capability. In an embodiment, the stepped portion 148 of the collar 114 deforms and flows around the second end 58 of the insert 16.

Figure 9:
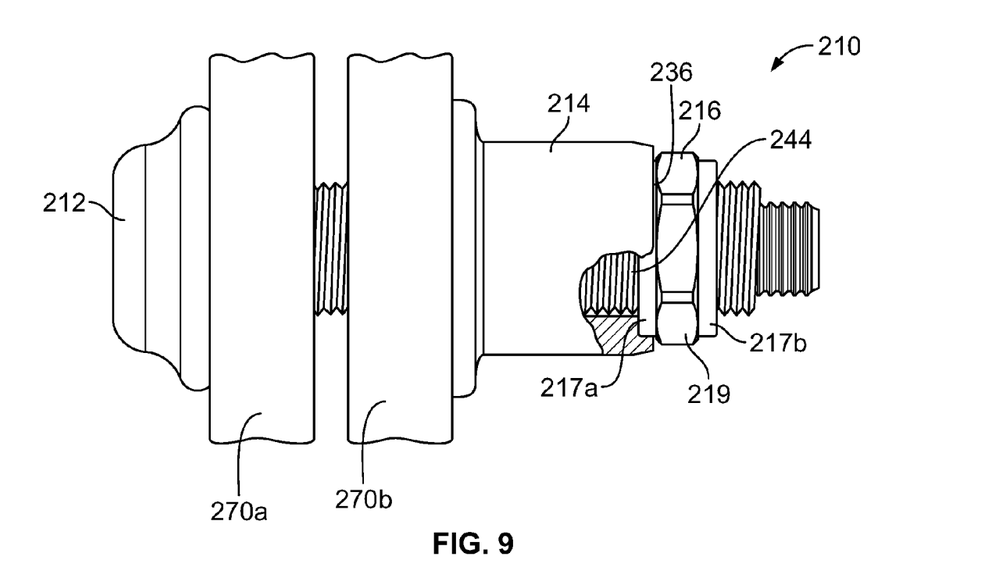
FIGS. 9 and 10 are side elevational views of another embodiment of a fastener.
Figure 10:
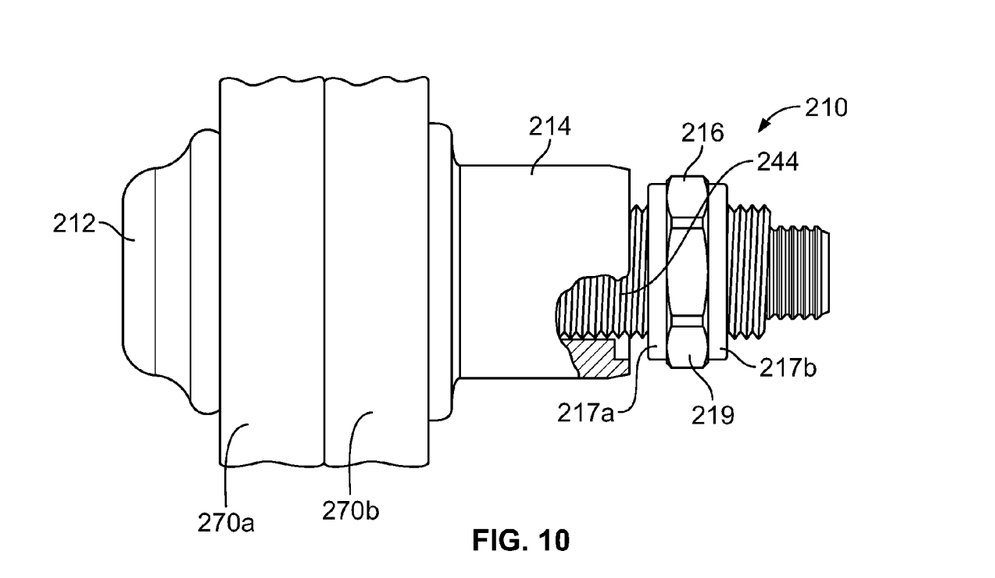

FIGS. 9 and 10 disclose an embodiment of a fastener 210. The fastener 210 is similar in structure and function of the fastener 10 unless as noted below. Referring to FIG. 9, the fastener 210 includes a pin member 212 and a collar 214 adapted to be swaged onto the pin member 212. In an embodiment, an insert 216 includes first and second cylindrical-shaped smooth portions 217a, 217b and a nut portion 219 intermediate the smooth portions 217a, 217b. In an embodiment, each of the smooth portions 217a, 217b is sized and shaped to fit within a through bore 244 of the collar 214, while a diameter of the nut portion 219 is larger than the inner diameter of the through bore 244 of the collar 214. In an embodiment, the nut portion 219 is hexagonal. In another embodiment, the nut portion 219 is square. In an embodiment, the fastener 210 is adapted to secure a plurality of work pieces 270a, 270b to one another. In an embodiment, the pin member 212 is inserted through holes of the work pieces 270a, 270b, and the collar 214 is fitted on the pin member 212. In an embodiment, the insert 216 is threaded onto the pin member 212 and the smooth member 217a (or if the insert 216 is reversed, the smooth member 217b) is positioned within the through bore 244 of the collar 214, and the nut portion 219 abuts a first end 236 of the collar 214, providing a fit-up, pre-assembled fastener prior to swaging. After swaging, as shown in FIG. 10, the collar 214 is swaged onto the pin member 212 and any gap between the work pieces 270a, 270b is closed by the collar 214. In an embodiment, the collar 214 moves away from the insert 216, and the insert 216 can be unthreaded and removed from the pin member 212.

Figure 11:
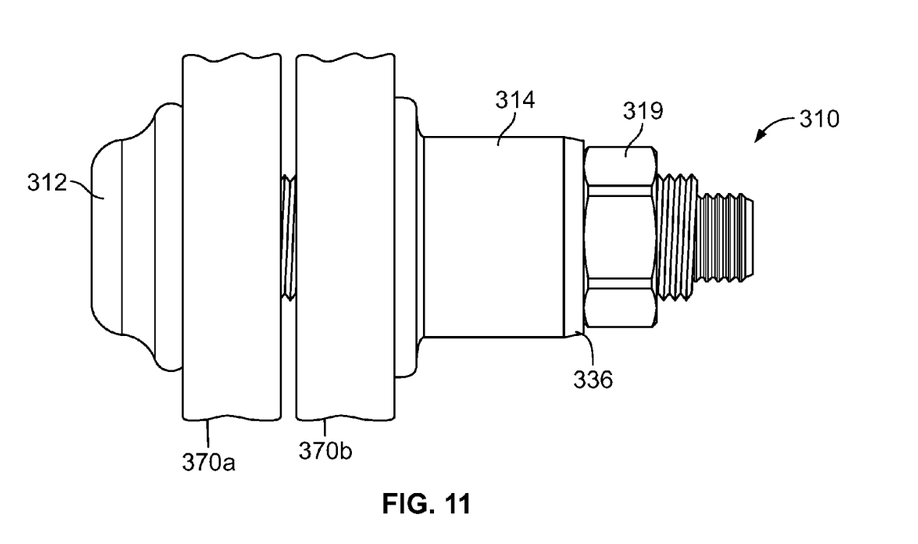
FIGS. 11 and 12 are side elevational views of another embodiment of a fastener.
Figure 12:
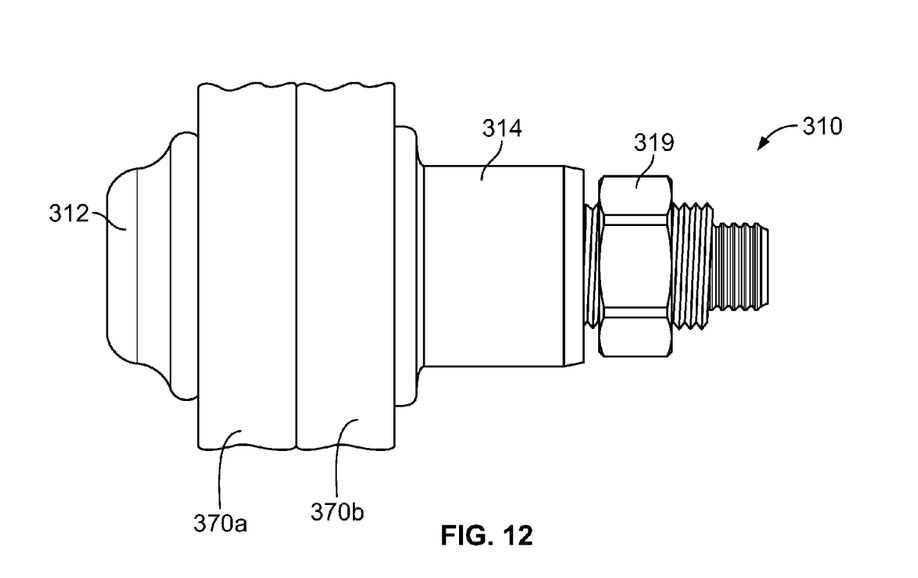

FIGS. 11 and 12 disclose an embodiment of a fastener 310. The fastener 310 is similar in structure and function of the fastener 110 unless as noted below. Referring to FIG. 11, the fastener 310 includes a pin member 312, a collar 314 adapted to be swaged onto the pin member 312, and a nut 319. In an embodiment, the nut 319 is a hexagonal nut. In another embodiment, the nut 319 is square nut. In an embodiment, the fastener 310 is adapted to secure a plurality of work pieces 370a, 370b to one another. In an embodiment, the pin member 312 is inserted through holes of the work pieces 370a, 370b, and the collar 314 is fitted on the pin member 312. In an embodiment, the nut 319 is threaded onto the pin member 312 until it abuts a first end 336 of the collar 314, providing a fit-up, pre-assembled fastener prior to swaging. After swaging, as shown in FIG. 12, the collar 314 is swaged onto the pin member 312 and any gap between the work pieces 370a, 370b is closed by the collar 314. In an embodiment, the collar 314 moves away from the nut 319, and the nut 319 can be unthreaded and removed from the pin member 312.

It should be understood that the embodiments described herein are merely exemplary and that a person skilled in the art may make many variations and modifications without departing from the spirit and scope of the invention. All such variations and modifications are intended to be included within the scope of the invention.

What is claimed is:
1. A fastener, comprising:
a pin member having an elongated shank portion having a first end and a second end, the shank portion including a head at the first end, a threaded portion intermediate the first end and the second end, and a pull portion at the second end, the threaded portion including an external thread;
a swage collar including a shank having a first end, a second end opposite the first end, and an outside diameter, a flange extending from the first end of the shank of the swage collar, and a through bore extending longitudinally from the first end to the second end, the through bore including a first interior portion extending from the first end to a stepped portion and forming a first inner wall having a first inner diameter, the through bore further including a second interior portion extending from the stepped portion to the second end and forming a second inner wall having a second inner diameter; and
an insert having a first end, a second end opposite the first end, an outside diameter, and a through bore extending longitudinally from the first end to the second end forming an inner wall, the inner wall including an internal thread extending from the first end to proximate to the second end and adapted to engage the external thread of the pin member.

2. The fastener of claim 1, wherein the first inner diameter of the swage collar is greater than the second inner diameter of the swage collar.

3. The fastener of claim 1, wherein the first inner diameter of the swage collar is less than the second inner diameter of the swage collar.

4. The fastener of claim 1, wherein the external thread comprises a helical thread.

5. The fastener of claim 4, wherein the threaded portion further comprises an annular groove positioned intermediate the head and the pull portion.

6. The fastener of claim 5, wherein a width of the annular groove is in the range of one times a pitch of the helical thread to two times a pitch of the helical thread.

7. The fastener of claim 1, wherein the pull portion comprises a plurality of annular pull grooves.

8. The fastener of claim 1, wherein the outside diameter of the insert is sized to form an interference fit with respect to the first inner diameter of the swage collar.

9. The fastener of claim 1, wherein the outside diameter of the insert is sized to form an interference fit with respect to the second inner diameter of the swage collar.

10. The fastener of claim 1, wherein the stepped portion is substantially perpendicular to a longitudinal axis of the swage collar.

11. The fastener of claim 1, wherein the swage collar further comprises an internal fit-up tab.

12. The fastener of claim 1, wherein the insert further comprises a nut portion intermediate the first end and the second end, a diameter of the nut portion being greater than the first inner diameter of the through bore of the swage collar and greater than the second inner diameter of the through bore of the swage collar.

13. The fastener of claim 12, wherein the nut portion is hexagonal in shape or square in shape.

14. The fastener of claim 1, wherein the flange of the swage collar is cylindrical in shape or hexagonal in shape.

15. The fastener of claim 1, wherein the swage collar is adapted to be swaged onto the pin member.

16. The fastener of claim 1, wherein the internal thread of the insert extends from the first end of the insert to the second end of the insert.

17. The fastener of claim 1, wherein the pin member comprises carbon steel.

18. The fastener of claim 17, wherein the pin member comprises a bolt selected from the group consisting of a Grade 9 strength level bolt, a Class 12.9 strength level bolt, a Grade 2 strength level bolt, a Grade 5 strength level bolt, a Grade 8 strength level bolt, a Class 8.8 strength level bolt, and a Class 10.9 strength level bolt.

19. The fastener of claim 1, wherein the swage collar comprises a material selected from the group consisting of low carbon steel, unannealed low carbon steel, annealed low carbon steel, medium carbon boron steel, 10B22 steel, medium carbon steel, and 1038 steel.

20. The fastener of claim 1, wherein the insert comprises medium carbon alloy steel.

* * * * *